United States Patent
Patterson et al.

(10) Patent No.: US 12,345,833 B2
(45) Date of Patent: Jul. 1, 2025

(54) VESSEL FIELD OF AWARENESS APPARATUS AND METHOD

(71) Applicant: Tocaro Blue LLC, Pensacola, FL (US)

(72) Inventors: Thomas Leonard Patterson, Pensacola, FL (US); Austin Gurley, Birmingham, AL (US)

(73) Assignee: TOCARO BLUE LLC, Pensacola, FL (US)

( * ) Notice: Subject to any disclaimer, the term of this patent is extended or adjusted under 35 U.S.C. 154(b) by 238 days.

(21) Appl. No.: 17/814,162

(22) Filed: Jul. 21, 2022

(65) Prior Publication Data
US 2023/0022049 A1 Jan. 26, 2023

Related U.S. Application Data

(60) Provisional application No. 63/223,999, filed on Jul. 21, 2021.

(51) Int. Cl.
| | |
|---|---|
| *G01S 7/41* | (2006.01) |
| *G01S 7/22* | (2006.01) |
| *G01S 13/88* | (2006.01) |
| *G01S 13/937* | (2020.01) |
| *H04L 67/52* | (2022.01) |

(52) U.S. Cl.
CPC .............. *G01S 7/412* (2013.01); *G01S 7/22* (2013.01); *G01S 13/886* (2013.01); *G01S 13/937* (2020.01); *H04L 67/52* (2022.05)

(58) Field of Classification Search
CPC .......... G01S 7/412; G01S 13/937; G01S 7/22; G01S 13/886; G01S 7/417; H04L 67/52
See application file for complete search history.

(56) References Cited

U.S. PATENT DOCUMENTS

| | | | |
|---|---|---|---|
| 2014/0019005 A1* | 1/2014 | Lee ...................... | G08G 1/0962 |
| | | | 701/301 |
| 2019/0377947 A1* | 12/2019 | Olsson .................... | G06V 20/00 |
| 2020/0050202 A1* | 2/2020 | Suresh ................... | G06V 20/00 |
| 2020/0074239 A1* | 3/2020 | Park ....................... | G06F 18/217 |
| 2020/0410301 A1* | 12/2020 | Delay ...................... | G08G 3/00 |
| 2022/0169348 A1* | 6/2022 | Neumann ............... | G01S 15/50 |
| 2022/0171019 A1* | 6/2022 | Neumann ................ | G01S 7/22 |
| 2022/0268585 A1* | 8/2022 | Tulgara ................... | B63B 79/15 |
| 2022/0335279 A1* | 10/2022 | Tyagi ..................... | G06N 20/00 |

(Continued)

*Primary Examiner* — Timothy A Brainard
*Assistant Examiner* — Kenneth W Good
(74) *Attorney, Agent, or Firm* — BURR & FORMAN LLP

(57) ABSTRACT

A field of awareness (FOA) system provides an operator of a vessel with intuitive object detection and positioning information. The system may comprise an FOA cloud server and an FOA unit. The FOA cloud server may be configured to perform a machine learning training operation to modify an FOA model based on a location-based relationship between training radar data and truth data. The FOA unit may be disposed on the vessel and may comprise processing circuitry configured to apply radar data to the FOA model to perform a comparison to determine a matched model signature, an associated matched object type, and an icon representation for the object of interest. The processing circuitry also be configured to control the display device to render the icon representation of the object at a position relative to a representation of the vessel based on the relative object position.

18 Claims, 11 Drawing Sheets

(56) References Cited

U.S. PATENT DOCUMENTS

| | | | |
|---|---|---|---|
| 2023/0005362 A1* | 1/2023 | Billapati | G01S 13/931 |
| 2023/0038494 A1* | 2/2023 | Shimokawabe | G01S 7/003 |
| 2023/0068036 A1* | 3/2023 | Park | G06F 18/21 |
| 2023/0128484 A1* | 4/2023 | Turbiner | G01S 13/933 |
| | | | 342/90 |

* cited by examiner

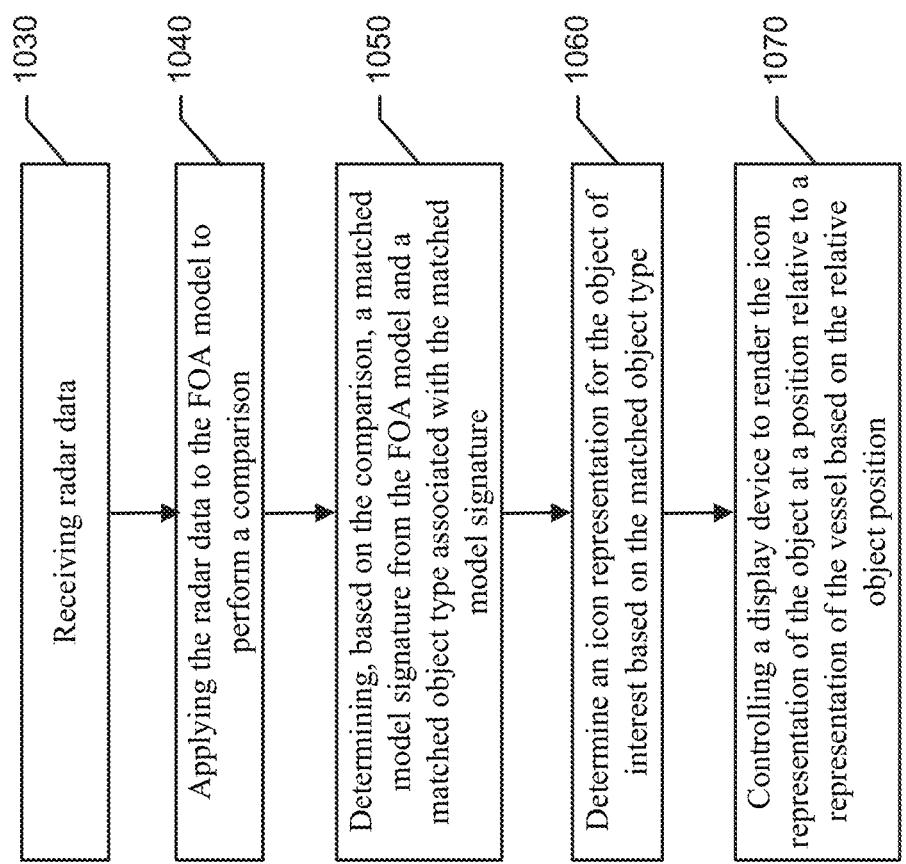

VESSEL FIELD OF AWARENESS APPARATUS AND METHOD

CROSS-REFERENCE TO RELATED APPLICATIONS

This application claims the benefit of U.S. Provisional Application No. 63/223,999 filed on Jul. 21, 2021, the entire contents of which are hereby incorporated herein by reference.

TECHNICAL FIELD

Example embodiments generally relate to object positioning and identification systems and, in particular, relate to object positioning, identification, and tracking in the context of vessel navigation and operation.

BACKGROUND

Radar systems have become commonplace on many marine vessels of a certain size, and such systems have proven to be useful for detecting other objects on the water that are in the surrounding area of the vessel. The radar information provided to a pilot or operator of a vessel can be extremely helpful for navigation and collision avoidance at sea, particularly in low visibility conditions.

The raw information, or radar data, provided by a radar system can be plotted on a display screen to present the radar data to the operator. However, presentation of the radar data provides only a minimal degree of useful information, particularly for an operator that is inexperienced with interpreting radar data. Even experienced users are not able to fully extract the value of the information captured in the radar data. As such, there continues to be a need to improve the ability to interpret radar data, possibly in combination with other data sources, to extract additional information from the radar data to facilitate improved and intuitive presentation of radar and other data for both novice and experienced operators.

BRIEF SUMMARY OF SOME EXAMPLES

According to some example embodiments, a field of awareness (FOA) system is provided. The FOA system may operate to provide an operator of a vessel with intuitive object detection and positioning information. The FOA system may comprise an FOA cloud server, a radar system, a display device, and an FOA unit. The FOA cloud server may be configured to receive training radar data, receive truth data, and perform a machine learning training operation to modify an FOA model based on a location-based relationship between the training radar data and the truth data. The radar system may be disposed on the vessel and may be configured to generate radar data based on transmitted radar signals and received radar reflection signals. The radar data may indicate, for an object of interest, a relative object position and a radar object signature. The FOA unit may be disposed on the vessel and, the FOA unit may comprise processing circuitry. The processing circuitry may be configured to receive the radar data and apply the radar data to the FOA model to perform a comparison of the radar object signature to model signatures of the FOA model. Each model signature may be associated with an object type. The processing circuitry may also be configured to determine, based on the comparison, a matched model signature from the FOA model and a matched object type associated with the matched model signature. The processing circuitry may be further configured to determine an icon representation for the object of interest based on the matched object type and control the display device to render the icon representation of the object at a position relative to a representation of the vessel based on the relative object position.

According to some example embodiments, a method is described for providing an operator of a vessel with intuitive object detection and positioning information relative to a vessel. The method may comprise receiving, at a FOA cloud server, training radar data and receiving, at the FOA cloud server, truth data. Additionally, the method may comprise performing, by the FOA cloud server, a machine learning training operation to modify an FOA model based on a location-based relationship between the training radar data and the truth data. Further, the method may comprise receiving, at an FOA unit, radar data. The radar data may be provided by a radar system configured to generate the radar data based on transmitted radar signals and received radar reflection signals. The radar data may indicate, for an object of interest, a relative object position and a radar object signature. Additionally, the method may comprise applying the radar data to the FOA model to perform a comparison of the radar object signature to model signatures of the FOA model. In this regard, each model signature may be associated with an object type. The method may further comprise determining, by processing circuitry of the FOA unit and based on the comparison, a matched model signature from the FOA model and a matched object type associated with the matched model signature. The method may also comprise determining an icon representation for the object of interest based on the matched object type, and controlling a display device to render the icon representation of the object at a position relative to a representation of the vessel based on the relative object position.

BRIEF DESCRIPTION OF THE SEVERAL VIEWS OF THE DRAWING(S)

Having thus described some embodiments in general terms, reference will now be made to the accompanying drawings, which are not necessarily drawn to scale, and wherein:

FIG. 10B illustrates a block diagram of an example method for providing an operator of a vessel with intuitive object detection and positioning information relative to a vessel according to various example embodiments.

DETAILED DESCRIPTION

Figure 1:
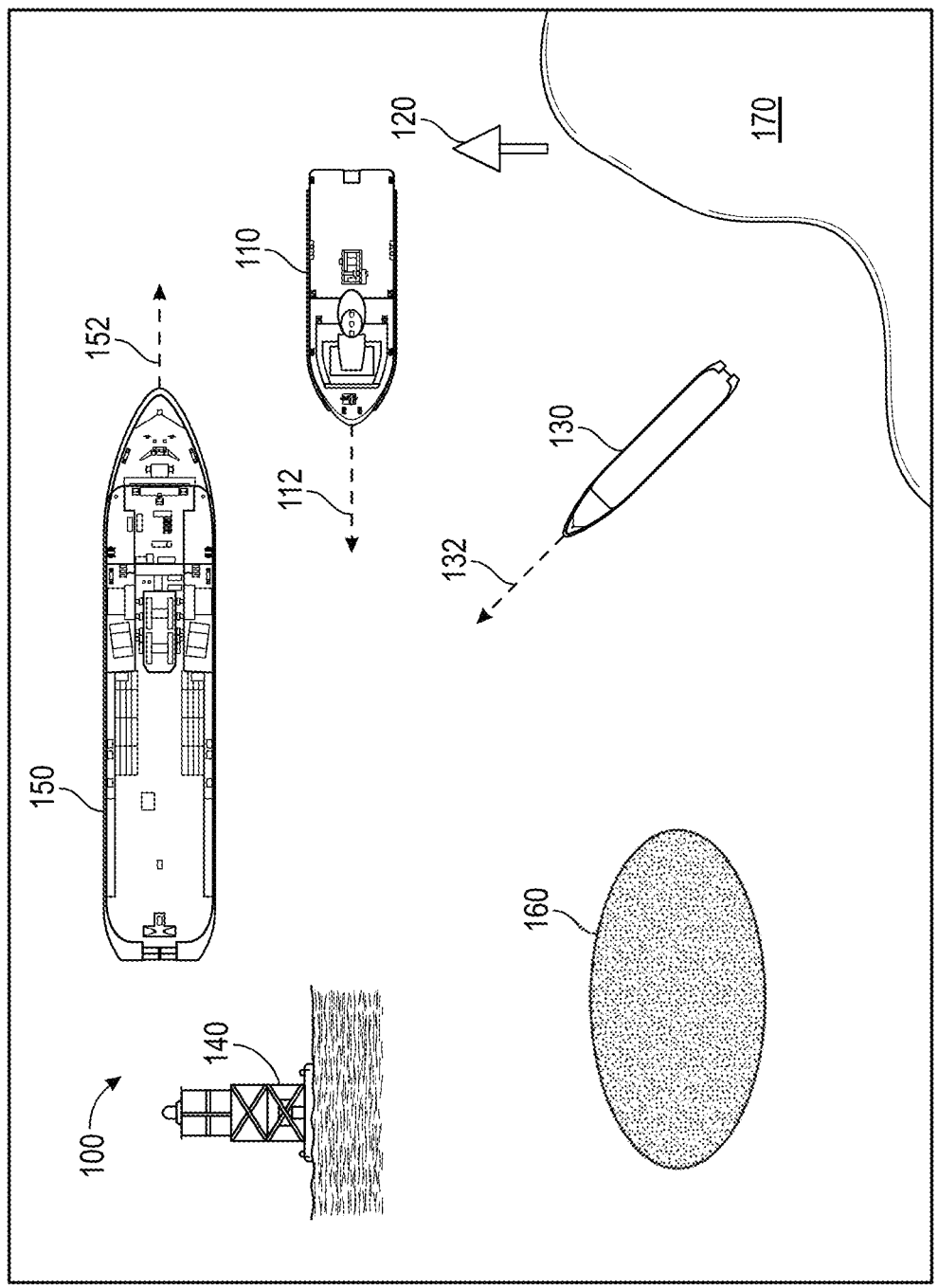
FIG. 1 illustrates an example environment in which field of awareness (FOA) techniques may be implemented according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

According to various example embodiments, apparatuses, systems, and methods are provided herein that generate an intuitive field of awareness (FOA) around an operator and an operator's vessel to easily comprehend and react to stationary and moving objects in the surrounding area. To do so, various example embodiments leverage an FOA model that can be used in conjunction with radar data from an on-board radar system to provide, for example, an intuitive presentation of positions of objects in a vessel's surroundings. As such, example embodiments provide an operator or pilot of a vessel with easy-to-interpret situational awareness information that avoids the need to interpret, for example, plotted-versions of radar and other data.

In this regard, according to some example embodiments, a machine-learned FOA model is used with the incoming radar data to digitally interpret the data, identify an object of interest, and classify the object of interest as, for example, a large watercraft (e.g., a ship, barge, or the like), a small watercraft (e.g., a jet ski, small boat, or the like), and a non-navigating object (e.g., a buoy, a channel marker, an undersea feature, land mass, or the like). Based on the object type, an icon representation may be rendered on a display screen of an on-board marine display or a mobile terminal at a position relative to the operator's vessel that is correlated with the real world relative position of the object of interest. Additionally, according to some example embodiments, new, post-classification radar data can be further analyzed with respect to the FOA model to track the object. Such tracking may be performed based on the determined object type. For example, the new, post-classification radar data may be filtered based on the determined object type. Additionally, the radar data may be analyzed to determine a course and speed of the object of interest and a possible point of collision and a time to collision. Based on this information an alert may be provided to the operator. Alerts may be modified to increase intensity as the risk of a collision increases, for example, at certain time or distance thresholds. In addition to visual alerts, audible alerts may also be provided.

The FOA model may be trained based on radar data in combination with truth data. Truth data may be data that has a particular level of reliability. Due to level of reliability, the radar data may be correlated to the truth data to determine relationships that can be leveraged to further train and improve the FOA model. According to some example embodiments, radar data, from an on-board radar system, may be buffered at the vessel. A bulk data set of radar data may be uploaded, as training radar data, to an FOA cloud server. According to some example embodiments, the bulk data set of radar data may be uploaded, at regular intervals or when the bulk data set reaches a threshold size, and then used to train the FOA model. Subsequent to the additional model training, the updated FOA model may be downloaded to an FOA unit on the vessel. According to some example embodiments, such model improvements may be performed using machine learning to increase the FOA model's ability to classify and track objects. Moreover, according to some example embodiments, the FOA model may be regularly updated via machine learning as new radar data and truth data may be provided to thereby build a more robust model.

According to some example embodiments, the truth data used to train the FOA model may be automatic identification system (AIS) data. AIS transmissions, which provide AIS data, have a standard format for marine vessels. The AIS transmissions may communicate vessel identification, position, course, and speed information to other vessels, and to land stations, for tracking purposes. The AIS data may also include, or being associated with, a time stamp. Because the AIS data is captured by sensors local to the transmitting vessel, the AIS data is considered highly reliable. As such, the AIS data can be used for comparison with locally captured radar data to identify data relationships for use in training the FOA model.

Another form of truth data may be navigational aid data, such as, for example, Light List data provided by the United States Coast Guard or shoreline map data available from the National Oceanic and Atmospheric Administration (NOAA). Such navigation aid data may indicate the geolocations of, for example, buoys, channel markers, and undersea features (e.g., shallow areas, rocks, sand bars, or the like), land masses, etc. Since such objects have static (or relatively static) positions, the navigation aid data indicating the positions of the objects can be considered highly reliable. Therefore, the navigation aid data may be also be used as truth data for static or non-navigating objects.

According to some example embodiments, when performing FOA model training, radar data may indicate an object's position based on a threshold density of radar returns from a particular location. As such, the radar data may indicate a relative object position for an object of interest based on the density of the radar returns within a certain area. Further, when truth data is available, the truth data may indicate a geolocation of an object. If the geolocation of an object from the truth data is the same or within threshold positional difference of a relative object position from the radar data and time stamps for the radar data and the truth data are the same, then a location and time-based correlation can be determined between the radar data and the truth data. Based on this correlation, truth information associated with the geolocation can be associated with the radar data associated with the object of interest and used to further train the FOA model.

In this regard, the radar data associated with the object of interest may have a particular organization and relative placement of returns that may be a function of the size and shape of the object. As such, the radar data includes not only position information for the object but also information about physical attributes of the object, which may be referred to as a radar object signature for the object. This radar object signature information may be included in a training set for the object to further train the FOA model, via machine learning, and improve its ability to classify and track the same, or similar, object in the future.

The trained FOA model may then be leveraged by a vessel to perform object classification and tracking, in real time, based on radar data or other data as further described herein. Predictions of the classification and tracking of an object may be performed without the use of truth data when, for example, truth data is unavailable. Additionally, once an object has be classified as a certain object type, the position or movement of the object may be tracked as a function of the object type. For example, if an object is determined to have a non-navigating object type (e.g., the object is a buoy or a channel marker), the object would be expected to remain stationary and therefore radar data that might indicate that the object is moving may be filtered and removed as noise from further tracking analyses. Similarly, movement characteristics for moving watercraft may also be associated with related object types. For example, a large vessel or watercraft may only be able to reach certain speeds or turn within a certain radius. As such, if an object is determined to have a large watercraft object type (e.g., the object is cruise ship or barge), the object would be expected to move according to a large watercraft movement profile. If, after classification, radar data associated with the large watercraft object that is outside the large watercraft movement profile may be filtered as noise and removed from the tracking analysis. By filtering data based on the object type, subsequent tracking can be simplified and performed at higher processing speeds because less data with higher relevancy is being analyzed. As such, an improvement in the performance of radar-based object tracking can be realized as an improvement in radar data processing technology relative to conventional solutions.

In view of the forgoing, FIG. 1 is provided which illustrates an example environment 100 and scenario for a vessel that is configured to implement FOA predictions (e.g., classification and tracking) based on a machine-learned FOA model, as described herein. The FOA vessel 110 may include a radar system and a FOA unit, as described herein, to perform FOA predictions. The FOA vessel 110 may be traveling on a course 112 at a given speed while an on-board radar system is capturing radar data.

The radar system of the FOA vessel 110 may sweep 360 degrees and may capture information about the surroundings of the FOA vessel 110. As such, the radar data may include high-density radar return areas for the various watercraft and non-navigating objects within the environment 100. In this regard, with respect to stationary objects, the radar data may be applied to an FOA model to classify the channel marker 120 as a non-navigating object. According to some example embodiments, as a pre-processing operation, radar data associated with the land mass 170 may be pre-filtered and removed from the classification and tracking analyses to improve performance. To do so, shoreline location information from, for example, NOAA shoreline map data may be used to determine the radar data to filter (i.e., radar data associated with locations on the land mass). When classification is complete and an object type for the channel marker 120 is determined, an icon representation of the channel marker 120 may then be rendered at a position relative to a representation of the FOA vessel 110 on a display of a display device, such as a marine equipment display or a mobile terminal. The position, or relative position, of the channel marker 120 may then be tracked, based on the radar data, in consideration of the channel marker's stationary movement profile associated with its determined object type as a non-navigating object.

Additionally, the radar data of the FOA vessel 110 may be applied to an FOA model to classify and track the buoy 140 as a non-navigating object, and then an icon representation of the buoy 140 may be rendered at a position relative to a representation of the FOA vessel 110 on a display of a display device. Subsequent radar data filtering and tracking may be performed based on the buoy 140's movement profile as indicated by its non-navigating object type. Since the buoy 140 is in the path of travel of the FOA vessel 110, the relative position of the buoy 140 may be tracked and if a predicted collision is determined to occur within a threshold period time, given a continued course and speed of the FOA vessel 110, then an alert may be triggered to notify the operator. Also, the radar data of the FOA vessel 110 or possibly sonar data provided by a sonar system of the FOA vessel 110, may be applied to an FOA model to classify and track the sea bed feature 160 as a non-navigating object, and then render an icon representation of the sea bed feature 160 at a position relative to a representation of the FOA vessel 110 on a display of a display device.

Similarly, with respect to moving watercraft, the radar data may be applied to an FOA model to classify and track the large vessel 150 as a large watercraft, and then render an icon representation of the large vessel 150 at a position relative to a representation of the FOA vessel 110 on a display of a display device. Again, after the object type of large watercraft is determined the associated movement profile may be used for subsequent radar data filtering in association with the large vessel 150. Accordingly, the radar data may be analyzed using the FOA model to determine the course and speed of the large vessel 150. Additionally, the radar data of the FOA vessel 110 may be applied to an FOA model to classify and track the small vessel 130 as a small watercraft, and then render an icon representation of the small vessel 130 at a position relative to a representation of the FOA vessel 110 on a display of a display device. Similar to the large vessel 150, the course 132 and speed of the small vessel 130 may also be determined through application of the radar data to the FOA model in a tracking operation. Based on the movement profiled for a small watercraft, filtering within the tracking operation may be performed. A determination may also be made that the course 112 of the FOA vessel 110 and the course 132 of the small vessel 130 will intersect at a possible collision point in the future. As such, the relative position of the small vessel 130 may be tracked and if a predicted collision is determined to occur within a threshold period time, given a continued course and speed of the FOA vessel 110 and the small vessel 130, then an alert may be triggered to notify the operator.

Figure 2:
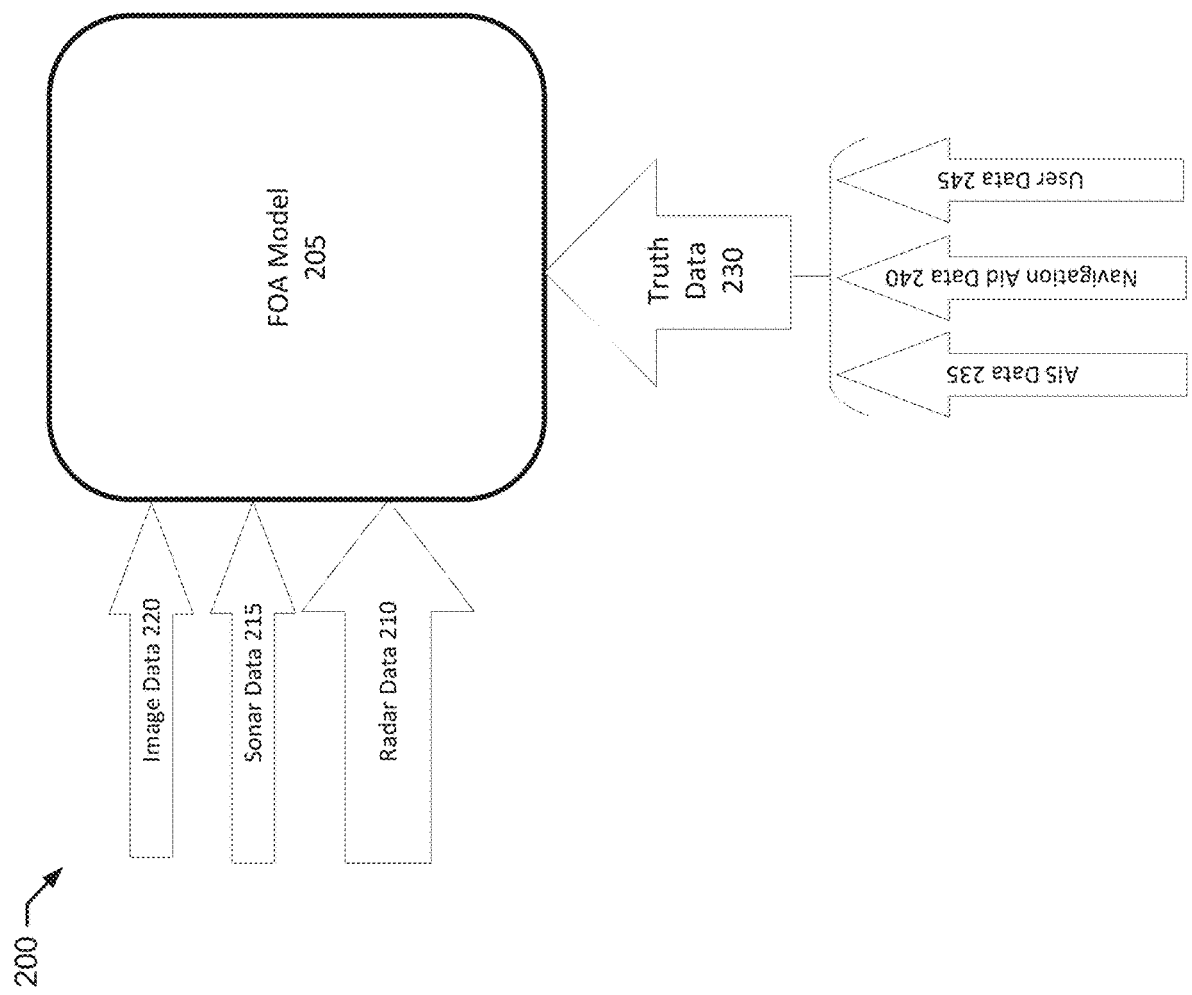
FIG. 2 illustrates an implementation of a model training approach using machine learning according to various example embodiments.

Having illustrated some example scenarios in which the FOA model may be leveraged for determining FOA predictions, FIG. 2 will now be described which illustrates the a implementation 200 of a training approach, using machine learning, for the FOA model 205. Such FOA model training may be performed, for example, at an FOA cloud server as further described herein. As described above, the FOA model 205 may be trained based on sensor data, such as radar data, in combination with truth data. Any type of sensor data that provides information about the physical aspects of an object may be useful for FOA model training. In this regard, according to some example embodiments, radar data 210 may be one type of sensor data that includes extractable information about an object, such as the object's position, course, speed, and the exterior physical appearance of an object. As described herein, radar data may be derived from reflecting radio signals from an object of interest. Since a position and orientation of the radar system may be known, for example, from a vessel's global positioning system (GPS) receiver and an electronic compass, radar data captured by the radar system can be geographically oriented. As such, the position and orientation data may be considered a component of the sensor data. As shown in FIG. 2, other types of sensor data may also be used, where such sensor data has, for example, position or location-based oriented. For example, sonar data 215 from a vessel's sonar system or image data 220 from a vessel's camera may also be oriented and used in a manner similar to radar data as described herein. Further, according to some example embodiments, LiDAR data may also be used as provided by a LiDAR system.

Such sensor data may be analyzed with respect to multiple captures or scans over time. For example, groups or areas of radar returns that are indicative of the presence of an object may be monitored across multiple sweeps of the radar system. A relative object position within the area of radar returns (e.g., a radar blob for the object) may be determined to be a centroid of the area of radar returns associated with the object. Further, machine vision techniques, such as blob or contour detection may be performed to develop a radar object signature. Further, a pose comprising a position, speed, and course may be determined via a tracking operation based on the sensor data. To do so, estimations may be implemented using a Kalman filter or an Extended Kalman filter on the sensor data.

In collaboration with correlated truth data 230 (e.g., correlated in location and time), the sensor data as radar data 210, sonar data 215, and image data 200 may be trained into the FOA model 205, using machine-learning techniques, with respect to a particular object to improve the model signature for the object. The FOA model 205 may comprise a machine learning classifier, such as a deep convolutional neural network (DCNN), which takes as input a radar 'blob' image isolated from the complete radar image, and predicts the classification of that image. The FOA model 205 may also take as inputs certain auxiliary data such as the speed and range of the radar blob. The FOA model 205 may also comprise auxiliary outputs besides the object type, such as the predicted speed and size of the object. One of ordinary skill in the art would appreciate that this machine learning classifier may be one of many topologies which are useful for classification in images, considering the data array of an isolated radar blob, or sequence of such blobs, as a 2D image. Another embodiment of the FOA model 205 may comprise a machine learning object detector, which takes as input a radar scan image and predicts the classification of all 'blobs' in that image. One of ordinary skill in the art would appreciate that the machine-learning network may be one of many topologies, which are useful for object detection in images, considering a complete radar scan as a two-dimensional image. The FOA model 205 may be trained by collecting many pairs of sensor data and truth data, and using optimization to determine network weight and bias parameters. One of ordinary skill in the art would appreciate that the FOA model 205 can be trained using data collected from one FOA unit, but that a more accurate and robust model can be developed by accumulating the truth and sensor data from many boats using a network, optimizing a single model with the accumulated data, and deploying the trained model to the FOA units.

As mentioned above, the truth data 230 may take different forms and may be received from various sources. Using a truth data location provided in the truth data, a location-based correlation can be made with the sensor data, which is also captured at a known location. Further, according to some example embodiments, a time based correlation using sensor data and truth data time stamps may also be considered. In this regard, as indicated in FIG. 2, examples of truth data 230 may include AIS data 235, navigation aid data 240, and user data 245. AIS data 235 may be received in a transmission (e.g., very high frequency (VHF) radio transmission) from a subject watercraft and may indicate a unique identifier of the watercraft, a geolocation, a course, and a speed of the watercraft. The navigation aid data, which may be, for example, Light List data or shoreline map data, may include geolocations and characteristics of various navigation-related markers including channel markers, buoys, and the like, as well as the geolocations for shorelines. According to some example embodiments, the navigation aid data may also include geolocation-based sea floor depth information and geolocations for undersea features such as rocks, sandbars, etc. For example, data describing shoreline maps (e.g., available from the National Oceanic and Atmospheric Administration (NOAA)) may be used or included in the navigation aid data.

Additionally, user data 245 may also be used as a form of truth data 230. In this regard, a user interface to an FOA unit as described herein may offer an operator the option of entering position and classification information directly via the user interface. In this regard, an operator may visually identify an object and its position, and the operator may input this information for use as truth data 230 to train the FOA model 205.

Accordingly, the sensor data and the truth data may be logged and buffered for upload to, for example, an FOA cloud server to perform FOA model training. The sensor data may be uploaded a training sensor data. Based on the training sensor data and the truth data 230, the FOA model 205 may be initially and regularly trained for use in determining predictions. As mentioned above, according to some example embodiments, the FOA model 205 may be trained, possibly at less frequent intervals, based on a training sensor data that has been aggregated over a period of time and truth data that has also been aggregated over the same period of time. The training process may involve a machine learning approach that leverages a truth correlation with the sensor data to improve the quality of the FOA model 205. As such, the introduction of subsequent training sensor data (e.g., radar data) with a related truth data correlation can develop a robust FOA model 205 to be used for subsequent classification and tracking of an object of interest.

Figure 3:
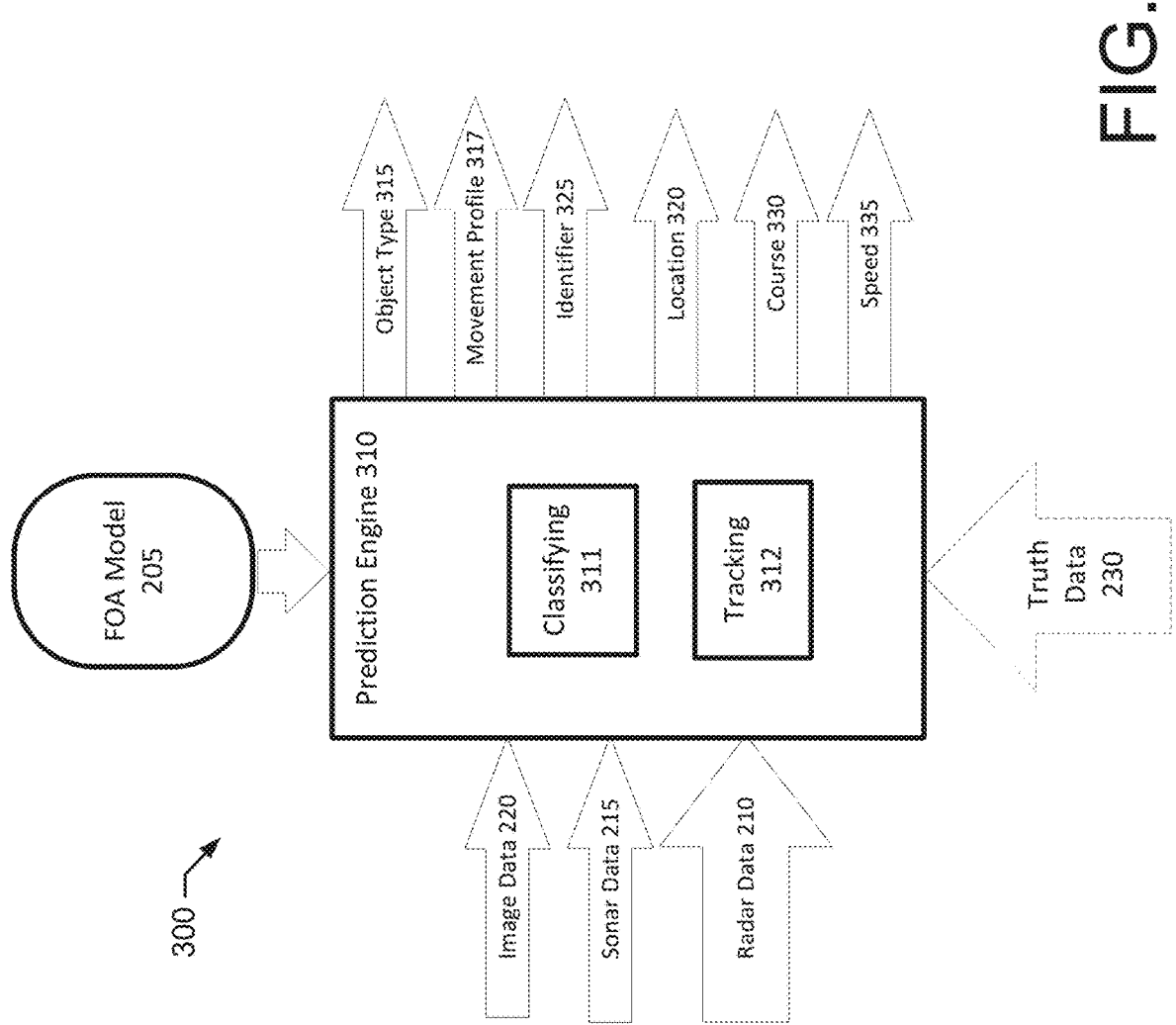
FIG. 3 illustrates an implementation of a model application approach according to various example embodiments.

FIG. 3 will now be described, which illustrates an implementation 300 of the FOA model 205 to make a prediction via a prediction engine 310. The prediction engine 310 may leverage the FOA model 205 to perform classifying 311 and tracking 312 of an object of interest. According to some example embodiments, the prediction engine 310 may be implemented by an FOA unit using radar data or other sensor data captured by sensors of on-board a vessel in real time or near real time. In this regard, according to some example embodiments, the sensor data captured at the vessel (e.g., radar data 210, sonar data 215, and image data 220) may be applied to the FOA model 205 in the absence of truth data 230 to perform classifying 311 and tracking 312. The sensor data, as radar data 210, sonar data 215, or image data 220, may have a data signature of an object of interest that may be compared to model signatures of the FOA model 205. To ultimately perform classifying 311 and tracking 312, comparisons may be performed to identify a model signature within the FOA model 205 that matches the data signature of the sensor data, within a comparison signature threshold (e.g., percent of relative similarity). If a match is found, then various information about the object of interest may be determined based on associations with the model signature. Upon determining a matched model signature, the object of interest may be classified, via the classifying 311 operation, by determining the object type 315 that is associated with the model signature within the FOA model 205. For example, the object type may be a large watercraft, a small watercraft, or a non-navigating object. Additionally, an identifier 325 of the object (i.e., a unique identifier) may be also be determined, for example, from the model signature. The identifier 325 may be serial number, which may be used to determine additional information such as a model number and associated manufacturing specifications (e.g., shape, size, etc.). Further, as mentioned above, classifying 311 may also determine a movement profile 317 for the object of interest based on the object type 315, which may be used for sensor data filtering during tracking 312.

The prediction engine 310 may also determine position-related information about the object of interest. In this regard, based on the application of the sensor data to the FOA model 205 and the determination of a model signature match, a location 320 may be determined. As mentioned above, since, for example, the radar object signature from the radar data may be different based on the side of the object that is facing the radar system or the pose of the object, the FOA model 205 may be used to determine a signature match, regardless of the relative orientation. Similarly, with respect to tracking 312, based on sequences of sensor data over time (e.g., subsequent radar scans), a course 330 and a speed 335 of the object of interest may be also be determined using the FOA model 205. At tracking 312, the location 320 may be updated and a course 330 and speed 335 may be determined for the object of interest. To perform tracking 312, the movement profile 317 that is based on the object type 315 may be used for sensor data filtering to enhance the performance of tracking 312. In this regard, the movement profile 317 may be applied to incoming sensor data associated with the object of interest, and, if the sensor is not in compliance with the movement profile 317 of the object of interest, then the non-compliant data can be removed from the tracking analysis and considered noise. In this regard, the movement profile 317 may be a multi-dimensional movement template for a given object type. According to some example embodiments, a movement profile 317 may indicate a maximum speed for the object type, and sensor data that would be associated with the object of interest moving faster than the maximum speed may be filtered. According to some example embodiments, a maximum speed for a non-navigating object, such as a channel marker, may be zero, and therefore any sensor data that would indicate movement of the channel marker could be filtered and not considered during tracking 312 of the channel marker. Similarly, according to some example embodiments, a minimum turn radius may be included in the movement profile 317. In this regard, a large watercraft object type may only be able to turn within a certain minimum turn radius. As such, sensor data that would indicate that the large watercraft is turning with a radius less than the minimum turn radius can be filter from the tracking analysis, again, to reduce the set of sensor data considered during tracking 312 and enhance performance. Additionally, while the truth data 230 is not required as an input to the prediction engine 310, truth data 230 is still shown in the context of implementation 300 because, if available, truth data 230 may be used by the prediction engine 310 for verification, or to assist with classification and tracking.

Figure 4:
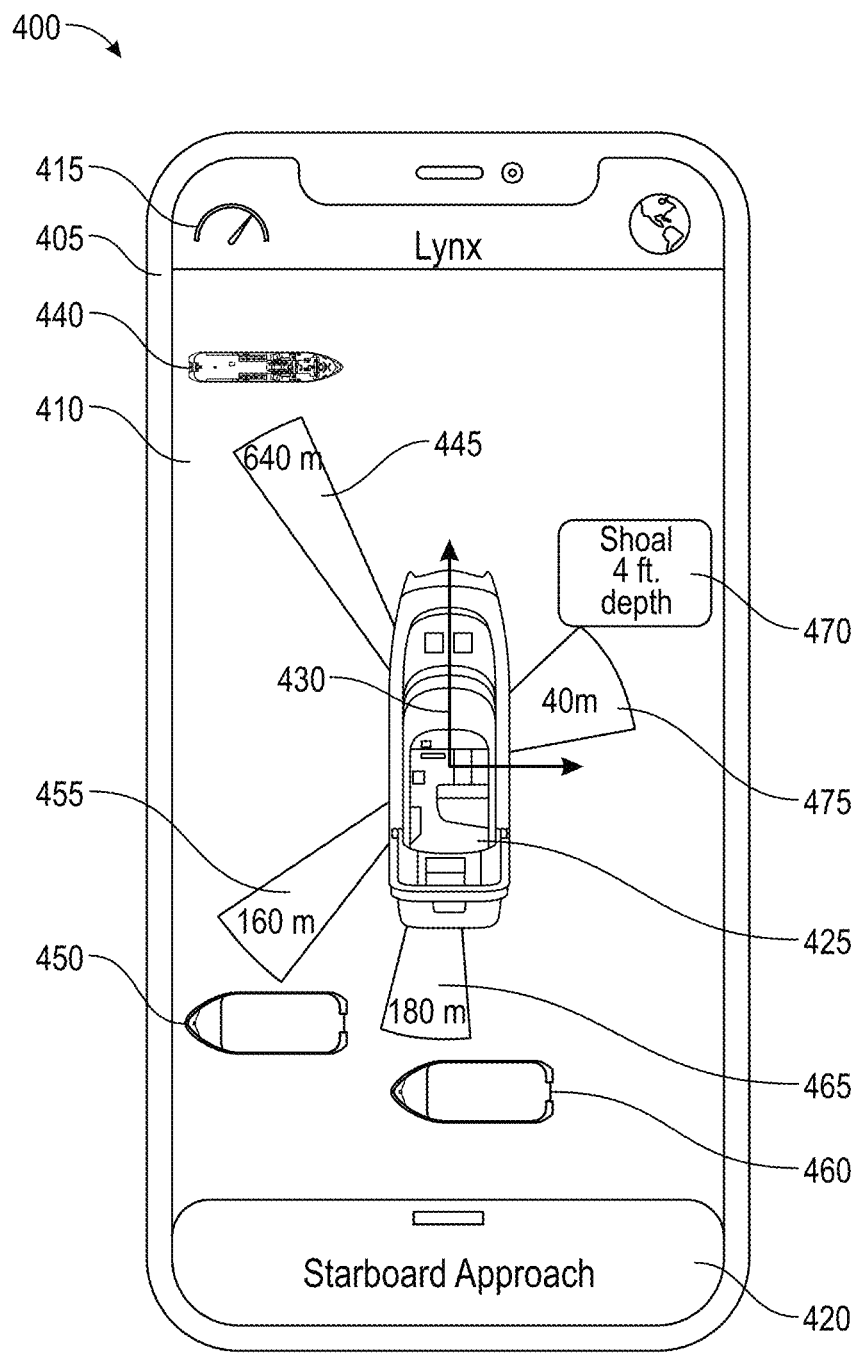
FIG. 4 illustrates an example intuitive FOA display according to various example embodiments.
Figure 5A:
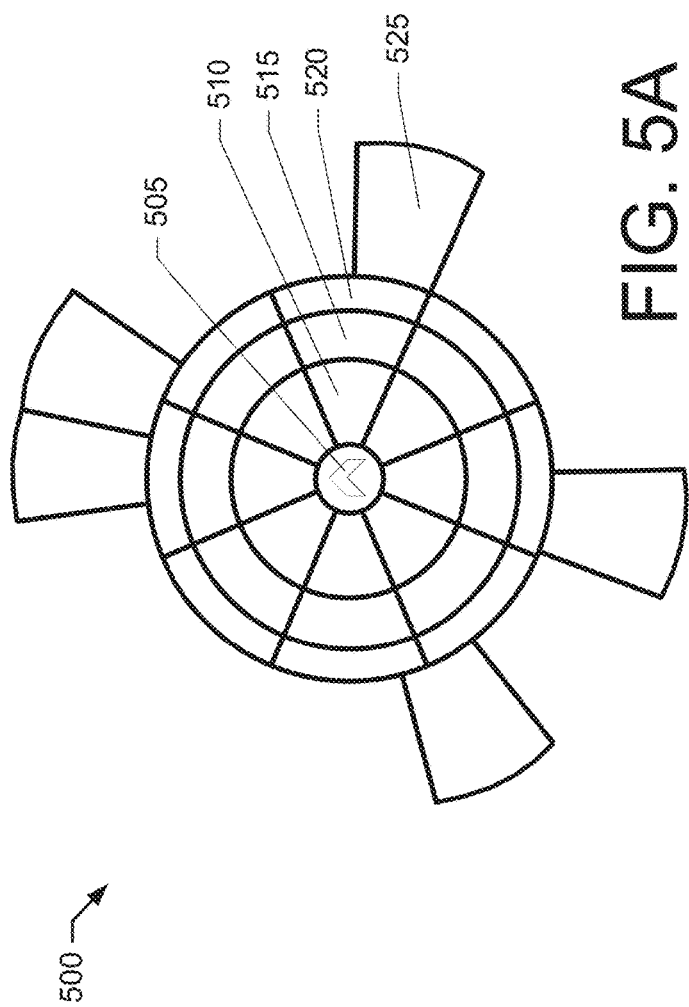
FIG. 5A illustrates an example of another intuitive FOA display according to various example embodiments.
Figure 5B:
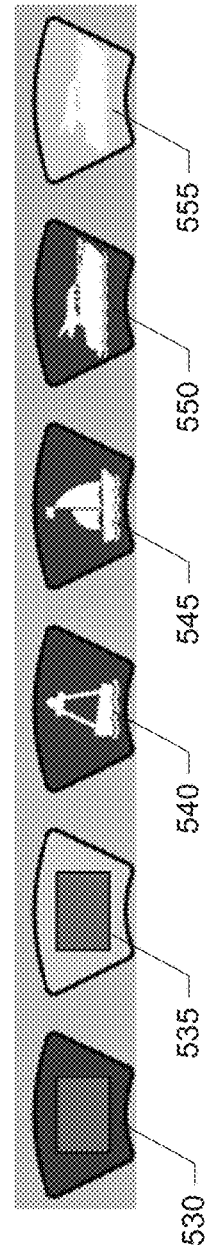
FIG. 5B illustrates a legend of icon representations for use with an intuitive FOA display according to various example embodiments.
Figure 6:
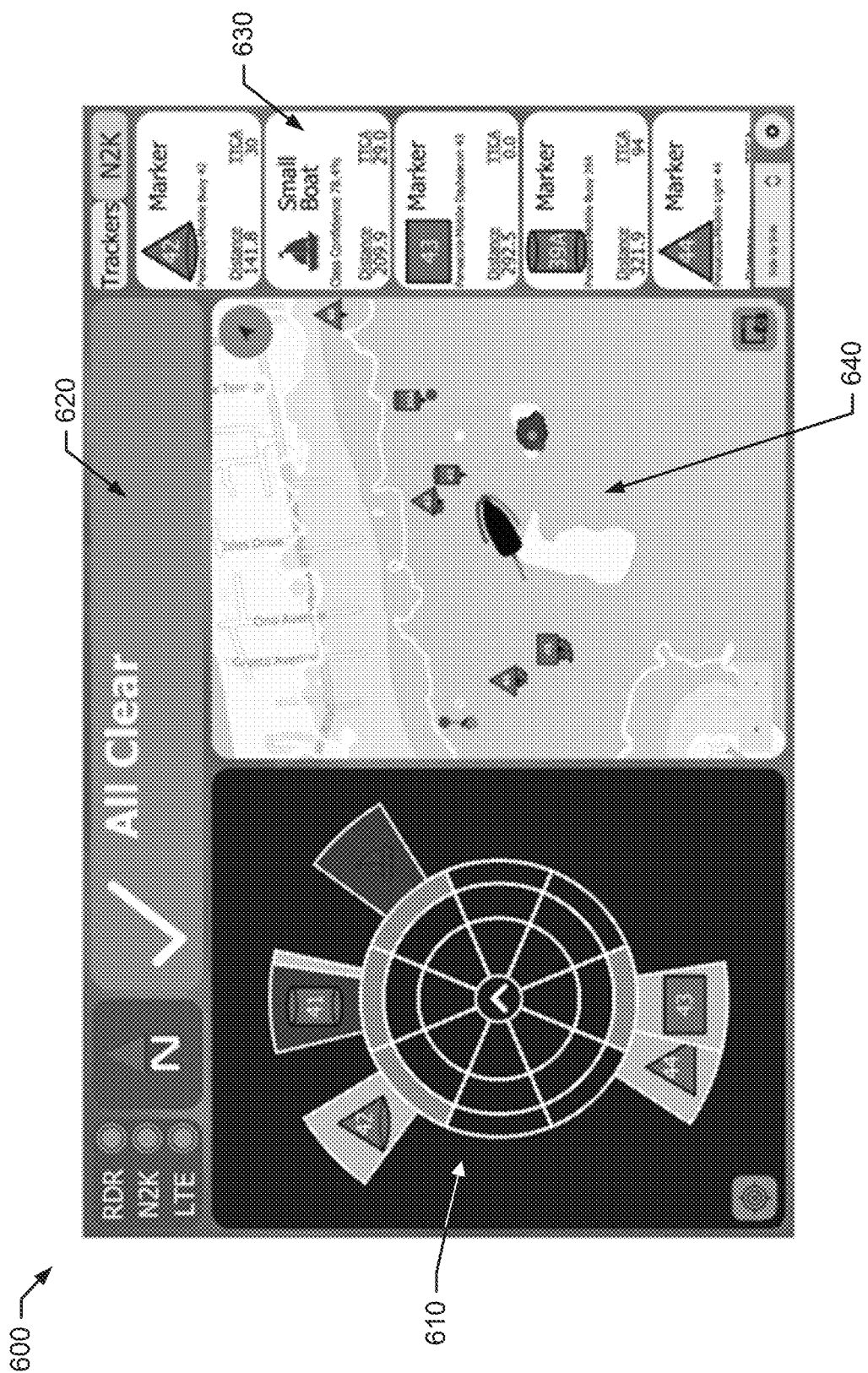
FIG. 6 illustrates an example of another intuitive FOA display according to various example embodiments.

FIGS. 4 through 6 illustrate example intuitive displays of determined FOA data as outputs from the prediction engine 310. With respect to FIG. 4, an example intuitive FOA display 400 is shown on a display screen 410 of a mobile terminal 405. The intuitive FOA display 400 may include a representation of the FOA vessel 425, for example, in a central location of the display screen 410 with the bow directed upwards. Relative coordinate axes may be provided at 430 for reference. Additionally, a speed indicator 415 may be provided.

With respect to the determined FOA data, according to some example embodiments, an icon representation of the object, based on the object type and associated within the FOA model 205, may be presented with a distance indicator. In this regard, the closest object that has been detected is a shoal with a 4 foot depth. An icon representation of the shoal 470 is provided at a location relative to the representation of the FOA vessel 425. Further, the associated distance indicator 475 may have a length that is, for example, proportional to the distance between the FOA vessel and the shoal as indicated by the predicted location. Additionally, based on the distance with respect to certain thresholds, a coloring of the distance indicator 475 may be selected and rendered. In this example, because the distance to the shoal is under 50 meters, the distance indicator 475 may be red in color to warn that the shoal is nearby. The red coloring may constitute the triggering of a visual alert. Additionally, based, for example, on this same threshold, an audible alert may be triggered. Further, another indicator of the closest object may be provided textually at the display section 420 at the bottom of the screen 410, which indicates that a starboard approach issue is present.

Further, an icon representation of a large vessel 440 may also be rendered on the intuitive FOA display 400 at a relative position. The distance indicator 445 may again be proportional in length relative to the actual distance to the large vessel. Since the large vessel has been determined to be further than a given distance threshold away from the FOA vessel, the distance indicator may be dark green. A first small vessel icon representation 450 may also be rendered on the intuitive FOA display 400 at a relative position. The distance indicator 455 may again be proportional in length relative to the actual distance to the first small vessel. Since the first small vessel has been determined to be more than a relatively safe distance threshold away from the FOA vessel, the distance indicator 455 may be light green. A second small vessel icon representation 460 may also be rendered on the intuitive FOA display 400 at a relative position. The distance indicator 465 may again be proportional in length relative to the actual distance to the second small vessel. Since the second small vessel has been determined to be more than a relatively safe distance threshold away from the FOA vessel, the distance indicator 465 may be colored light green.

Now with reference to FIGS. 5A and 5B, another intuitive FOA display 500 is shown. The display 500 includes concentric rings that are segmented into pie-shapes. The pie-shaped segment is used to indicate the general directional position of an object relative to FOA vessel, which is represented by the arrow 505. The point or tip of the arrow 505 may be oriented toward the bow of the FOA vessel. Around the exterior of the concentric rings, an icon representation of the FOA predicted object type may be rendered at a position that is correlated to a location of the associated object.

As an example, the icon representation 525 is positioned at an exterior of the concentric rings and at a location that is directionally aligned with the actual object position relative to the FOA vessel. The icon representation 525 may be selected from a legend of icon representations as shown in FIG. 5B. In this regard, and icon representation 535 (i.e., rectangle with light background) may be used for a channel marker that has been determined with the assistance of truth data. The icon representation 540 (i.e., image of a buoy with dark background) may be used for a buoy that has been determined without truth data. The icon representation 545 (i.e., image of a small boat with dark background) may be used for a small watercraft that has been determined without truth data. The icon representation 550 (i.e., image of a large boat with dark background) may be used for a large watercraft that has been determined without truth data. The icon representation 555 (i.e., image of a large boat with light background) may be used for a large watercraft that has been determined with truth data. As such, the image of the icon representation may be indicative of the object type of the object of interest and the background color of the icon representation may be indicative of the reliability of the data used to determine the FOA prediction.

Additionally, the ring segments of the intuitive FOA display 500 are activated based on the distance of the object of interest from the FOA vessel. Each ring may be assigned a distance range. As such, the segment 520 may be associated with a furthest distance range, segment 515 may be associated with an intermediate distance range, and segment 510 may be associated with a closest distance range. In this regard, a given segment may be colored in association with its distance from the FOA vessel. For example, if the object of interest associated with icon representation 525 is within the closest range, then the segment 510 may be colored, for example, red. If the object of interest associated with icon representation 525 is associated with the intermediate range, then the segment 515 may be colored, for example, light green. However, if the object of interest associated with icon representation 525 is associated with the most distant range, then the segment 520 may be colored, for example, light green.

Now referring to FIG. 6, another intuitive FOA display 600 is shown, which may be rendered on a marine equipment display. The intuitive FOA display 600 may comprise a display 610, which is another example implementation the display 500 described above. The display 600 may also include a header message 620 that provides important textual information for the operator regarding the presence of objects in the vicinity of the FOA vessel. Column 630 includes tabular information regarding each classified and tracked object using the FOA model 205. Finally, the geomap section 640 may provide a map-based visualization of the FOA vessel and the identified objects plotted on the geomap.

With respect to the hardware configuration that may be implemented to support example embodiments, a block diagram of an FOA vessel 700 will now be described. According to some example embodiments, the vessel 700 may include a common bus 705, which may be implemented as a common data and control bus trunkline throughout the vessel. The common bus 705 may, according to some example embodiments, be implemented as a National Marine Electronics Association (NMEA) 2000 backbone bus. In this regard, the common bus 705 may be used as both a power supply and a data bus for the exchange of data between entities on the same watercraft. In this regard, various entities or components may be connected to the common bus 705 and the common bus 705 may operate as a network-type connection point between the various entities or components.

In this regard, the FOA vessel 700 may comprise a speed transducer 710 which may be connected to the common bus 705 and may be configured to detect a current speed of the FOA vessel 700. Additionally, the FOA vessel 700 may comprise a depth transducer 715 that is connected to the common bus 705 and configured to use sound waves (e.g., sonar) or the like to determine a depth of the sea floor below the FOA vessel 700. Along similar lines, the FOA vessel 700 may additionally or alternatively have a sonar system 720 that is configured to scan undersea surroundings of the FOA vessel 700 and generate sonar data of the sea floor. The FOA vessel 700 may also comprise a battery 725 that is connected to the common bus 705 to provide power to entities that require power from the common bus 705.

The FOA vessel 700 may also comprise an engine monitor 735 that is connected to the common bus 705 and is configured to monitor various characteristics of engine operation and generate engine data for provision to the common bus 705. Additionally, the FOA vessel 700 may comprise an electronic compass 740 that is connected to the common bus 705 and is configured to provide bearing data to the common bus 705. Further, according to some example embodiments, an inertial measurement unit (IMU) 752 may be included and connected to the common bus 705. The IMU may include an accelerometer, gyroscope, or to the like and may be configured to measure and provide data indicative of pitch, roll, and yaw of the FOA vessel 700. A camera 745 may also be included that is connected to the common bus 705 and is configured to capture images of the surroundings of the FOA vessel 700 for provision to the common bus 705. A radio 750 may also be included. The radio 750 may be a primary communication device for communicating with remote vessels and devices. Via the radio 750, information such as AIS data may be received.

The FOA vessel 700 may also include a sounder 757 that is connected to the common bus 705 and controllable by any entity connected to the common bus 705. A display 755 may also be connected to the common bus 705 and may be configured to display information that is provided to the display 755 via the common bus 705. A user interface 760 may also be connected to the common bus 705. The user interface 760 may be configured to receive inputs from a user for provision to the common bus 705 and provide outputs to the user based on inputs received from the common bus 705. A global positioning system (GPS) receiver 765 may also be included that is configured to determine a geolocation of the FOA vessel 700 and provide position data to the common bus 705. Additionally, a navigation system 775 configure to control the movements of the FOA vessel 700 may be connected to the common bus 705 and may be configured to provide, for example, autonomous navigation control of the FOA vessel 700 based on the FOA predictions.

The FOA vessel 700 may also include a radar system 770 that is connected to the common bus 705. As mentioned above, the radar system 770 may generate radar data that indicates a relative object position and a radar object signature for an object of interest. The FOA vessel 700 may also include an FOA unit 730 that will be described in more detail below, but is generally configured to leverage a FOA model 205 to perform FOA predictions as described herein. According to some example embodiments, the FOA unit 730, the radar system 770, and the display 755 may collectively make up a vessel FOA apparatus. According to some example embodiments, a vessel FOA apparatus may include other components, and leverage the data provided by those components, such as those connected to the common bus 705 including the GPS receiver 765 and the compass 740.

Figure 7:
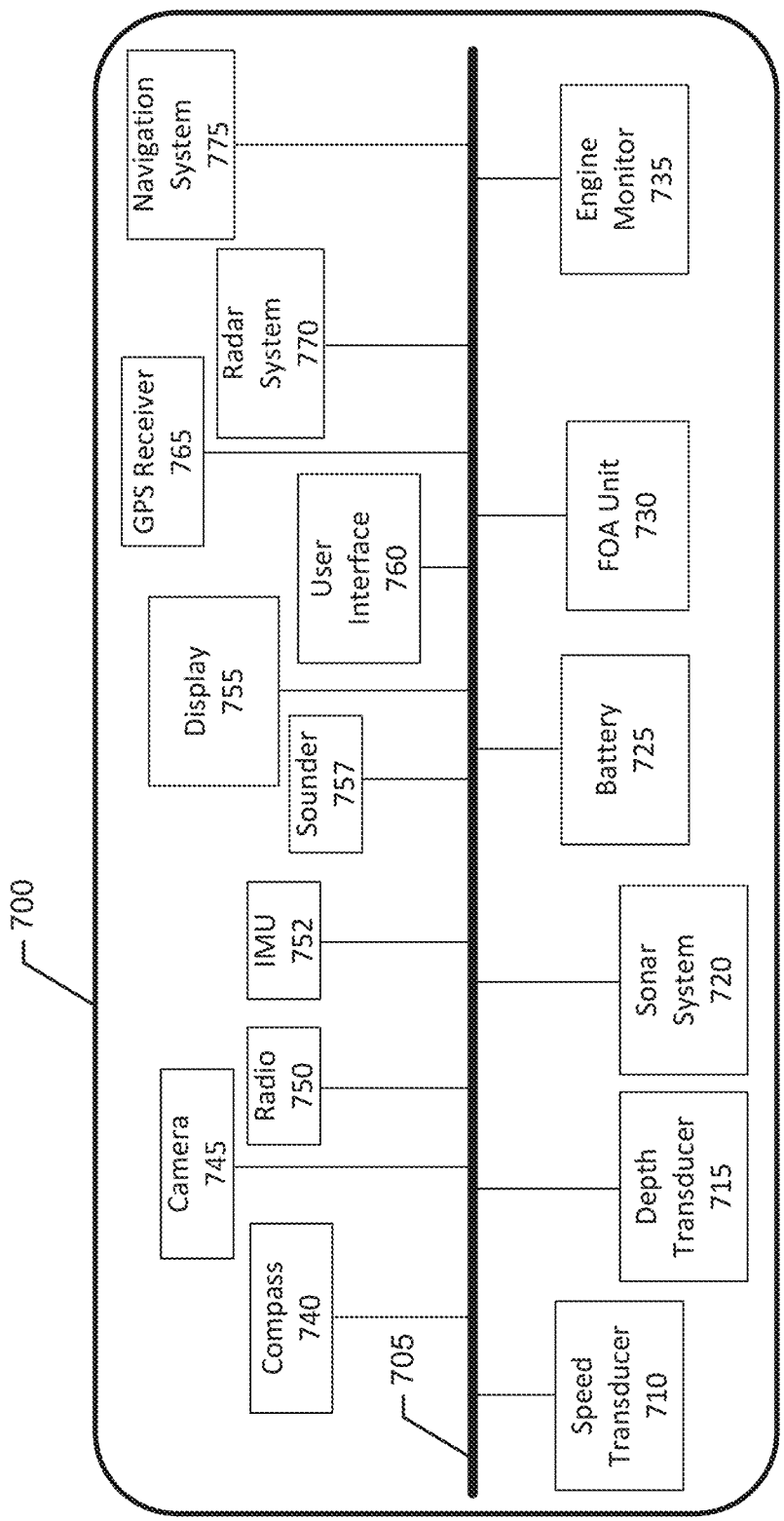
FIG. 7 illustrates a block diagram of an FOA vessel with a common bus according to various example embodiments.

One of skill in the art would appreciate that the components described in FIG. 7 may be connected in other ways. For example, rather than the common bus 705, the components may be connected via a network having one or more hubs. Alternatively, the components may be connected in an adhoc manner. Further, the components of the FOA vessel 700 may be connected via wired connections or wireless connections and associated protocols.

Figure 8:
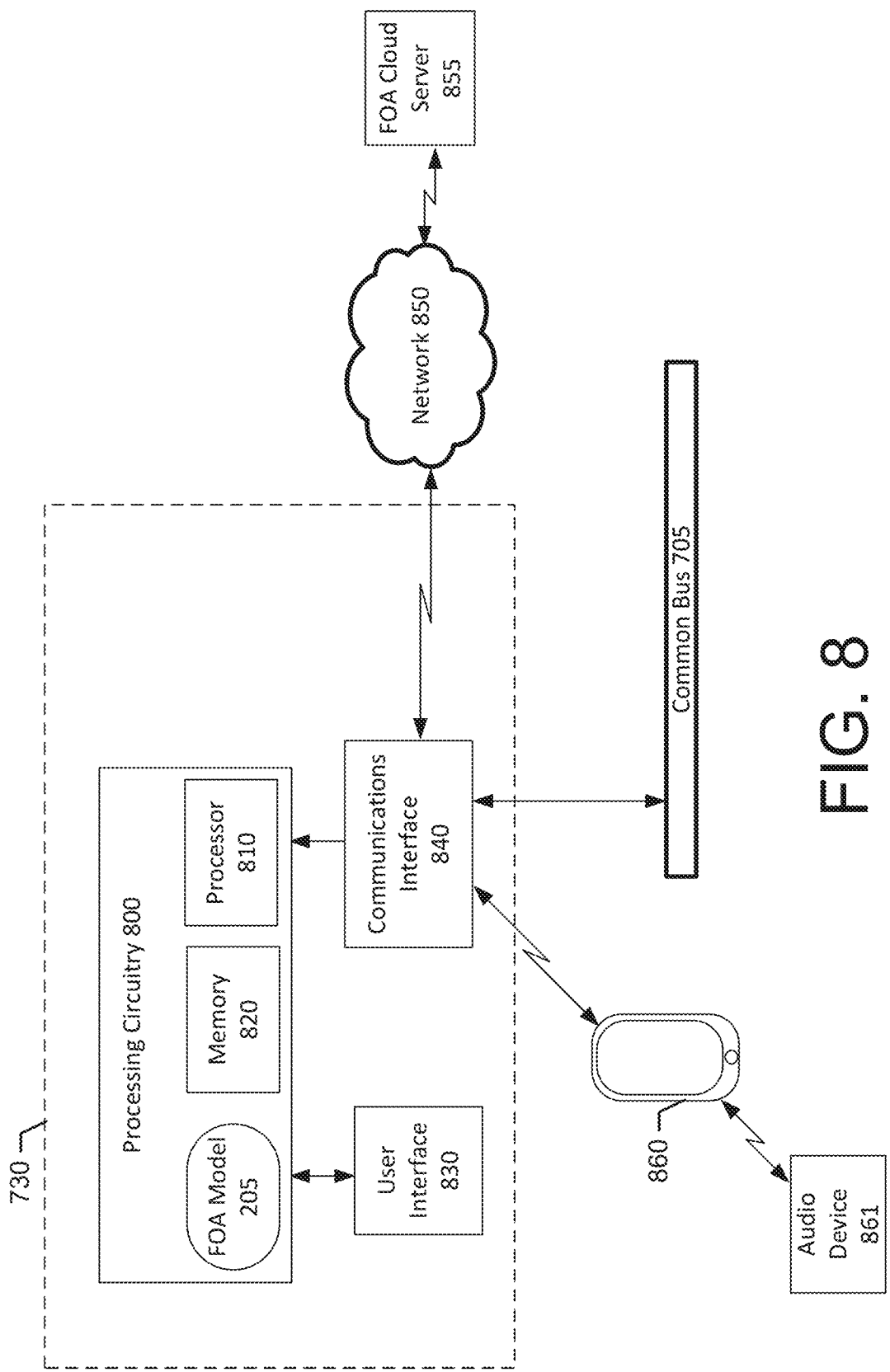
FIG. 8 illustrates a block diagram of an FOA unit according to various example embodiments.

Now referring to FIG. 8, an example configuration of the FOA unit 730 is provided as a more detailed block diagram. The FOA unit 730 may be disposed on-board the vessel 700 as mentioned above. FOA unit 730 comprises processing circuitry 800. Processing circuitry 800 may, in turn, comprise a processor 810, a memory 820, the FOA model 205 (which may be stored in the memory 820), a user interface 830, and a communications interface 840. Additionally, the FOA unit 730 may include additional components not shown in FIG. 8 and the processing circuitry 800 may be operably coupled to other components of the FOA unit 730 that are not shown in FIG. 8.

Further, according to some example embodiments, processing circuitry 800 may be in operative communication with or embody the memory 820, the processor 810, the user interface 830, and the communications interface 840. Through configuration and operation of the memory 820, the processor 810, the user interface 830, and the communications interface 840, the processing circuitry 800 may be configurable to perform various operations as described herein, including the operations and functionalities described with respect to the FOA model 205. In this regard, the processing circuitry 800 may be configured to perform computational processing, machine learning, memory and data management (e.g., encryption and compression), user interface control and monitoring, local and remote communications management, and the like, according to various example embodiments. In some example embodiments, the processing circuitry 800 may be embodied as a chip or chip set. In other words, the processing circuitry 800 may comprise one or more physical packages (e.g., chips) including materials, components, or wires on a structural assembly (e.g., a baseboard). The processing circuitry 800 may be configured to receive inputs (e.g., via peripheral components and input/output interfaces), perform actions based on the inputs, and generate outputs (e.g., for provision to peripheral components and communications interfaces). In an example embodiment, the processing circuitry 800 may include one or more instances of a processor 810, associated circuitry, and memory 820. As such, the processing circuitry 800 may be embodied as a circuit chip (e.g., an integrated circuit chip, such as a field programmable gate array (FPGA)) configured (e.g., with hardware, software or a combination of hardware and software) to specifically perform operations described herein.

As mentioned above, the processing circuitry 800 may be embodied in a number of different ways. For example, the processing circuitry 800 may be embodied as various processing means such as one or more processors 810 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 800 may be configured to execute instructions stored in the memory 820 or otherwise accessible to the processing circuitry 800. As such, whether configured by hardware or by a combination of hardware and software, the processing circuitry 800 may represent an entity (e.g., physically embodied in circuitry—in the form of processing circuitry 800) capable of performing operations according to example embodiments while configured accordingly. Thus, for example, when the processing circuitry 800 is embodied as an ASIC, FPGA, or the like, the processing circuitry 800 may be specifically configured hardware for conducting the operations described herein. Alternatively, as another example, when the processing circuitry 800 is embodied as an executor of software instructions, the instructions may specifically configure the processing circuitry 800 to perform the operations described herein.

In an example embodiment, the memory 820 may include one or more non-transitory memory devices such as, for example, volatile or non-volatile memory that may be either fixed or removable. The memory 820 may be configured to store information, data, applications, instructions, or the like for enabling, for example, the functionalities described with respect to the FOA model 205. The memory 820 may be configured to buffer instructions and data during operation of the processing circuitry 800 to support higher-level functionalities, and the memory 820 may be configured to store instructions for execution by the processing circuitry 800. The memory 820 may also store various information for model enhancement and data evaluation for predictive solutions. For example, according to some example embodiments, the FOA model 205 may be permanently or temporarily stored on the memory 820. Additionally, other data (e.g., truth data in the form of, for example, navigational aid data) that may be used to for machine learning and predictive analytics may be stored on the memory 820. Data, such as radar data, image data, sonar data, AIS data, or the like may be loaded into the memory 820 to be acted upon as a working register. According to some example embodiments, various data stored in the memory 820 may be generated based on other data and stored or the data may be retrieved via the communications interface 840 and stored in the memory 820.

The communications interface 840 may include one or more interface mechanisms for enabling communication with other devices external to the FOA unit 730. For example, the communications interface 840 may provide an interface between the processing circuitry 800 and an external network 850 (e.g., the Internet), the common bus 705, and external device (e.g., via wired or wireless connections) such as the mobile terminal 860. As such, the communications interface 840 may be configured to support communications with a variety of entities external to the FOA unit 730 via wired or wireless connections. In some cases, the communications interface 840 may be any means such as a device or circuitry embodied in either hardware, or a combination of hardware and software that is configured to receive or transmit data from/to devices in communication with the processing circuitry 800. The communications interface 840 may be a wired or wireless interface and may support various communications protocols (WIFI, Bluetooth, cellular, or the like).

The communications interface 840 may a establish communications connection with the network 850 to gain access to the FOA cloud 855. As further described below with respect to FIG. 9, the FOA cloud 855 may be a working repository for one or more FOA models. Additionally, the communications interface 840 may connect the FOA unit 730 to the common bus 705. With access to the common bus 705, the FOA unit 730 may exchange data or control entities connected to the common bus 705. According to some example embodiments, the communications interface 840 may also be configured to establish a communications connection with, for example, a mobile terminal 860. Via the connection wherein the communications interface 840, the may operate as a display device for the FOA unit 730 as described herein. In this regard, the mobile terminal 860 may be configured to wirelessly communicate to the FOA unit 730 and operate as an input and output device for the FOA unit 730. As such, according to some example embodiments, the mobile terminal 860 may operate as an external user interface for the FOA unit 730. According to some example embodiments, the mobile terminal 860 may be configured to output, for example, audible sound as an alert either via a sounder local to the mobile terminal 860 or a sounder that is a component of an external audio device 861 that may be connected to the mobile terminal 860 (e.g., via Bluetooth or the like).

According to some example embodiments, the FOA unit 730 may comprise a user interface 830. However, according to some example embodiments, the FOA unit 730 may employ an external user interface that is connected to the processing circuitry 800 via the communications interface 840, such as the user interface 760. From a functionality perspective, the user interface 830 and the user interface 760 may be the same or similar. The user interface 830 may be controlled by the processing circuitry 800 to interact with peripheral user interface components or devices that can receive inputs from a user or provide outputs to a user. In this regard, via the user interface 830, the processing circuitry 800 may be configured to receive inputs from an input device, which may be, for example, a touch screen display, a keyboard, a mouse, a microphone, or the like. The user interface 830 may also be configured to provide control and outputs to peripheral devices such as, for example, a display (e.g., a touch screen display), sounder (e.g., speaker), or the like. The user interface 830 may also produce outputs, for example, as visual outputs on a display, audio outputs via a sounder, or the like.

According to some example embodiments, the FOA unit 730, in collaboration with other devices to make up a vessel FOA apparatus, may be configured to perform various functionalities as described herein. In this regard, also referring to FIG. 7, an example vessel FOA apparatus may comprise the FOA unit 730 and its processing circuitry 800, the radar system 770, and the display 755 or the mobile terminal 860 operating as a display device. The vessel FOA apparatus may be configured to provide an operator of a vessel with intuitive object detection and positioning information by leveraging these components, and possibly others, in coordination with data evaluation performed FOA model 205.

As such, the processing circuitry 800 may be configured to support the functionality of the vessel FOA apparatus as described herein. In this regard, the FOA unit 730 may be configured to support FOA model training as described above with respect to FIG. 2. To do so, the processing circuitry 800 may be configured to receive sensor data, such as radar data from the radar system 770, for example, via the common bus 705. The processing circuitry 800 may be configured to buffer the sensor data in, for example, the memory 820. In response to a triggering event, the buffered sensor data may be uploaded, via the communications interface 840 and the network 850, to the FOA cloud server 855, which may be configured to perform FOA model training using machine learning, as described herein, to generate or update the FOA model 205.

Further, the FOA cloud server 855 may also be configured to receive truth data. For example, in an example embodiment where the truth data is MS data, the FOA cloud server 855 may receive the truth data with the sensor data from the FOA unit 730. As such, according to some example embodiments, the processing circuitry 800 of the FOA unit 730 may also be configured to buffer and upload truth data to the FOA cloud server 855. Alternatively or additionally, according to some example embodiments, the FOA cloud server 855 may receive the truth data from another source. According to some example embodiments, where the truth data is static (e.g., navigational aid data) the truth data may be stored in, for example, a database at the FOA cloud server 855. Regardless of the source of the truth data, the truth data may be correlated with the sensor data via location or time and location relationships (e.g., time stamps and geolocations). According to some example embodiments where the truth data includes AIS data, the AIS data may be received via, for example, the radio 750, which is configured to receive AIS transmissions from other vessels or the like on the VHF band. Regardless of the manner in which the sensor data or the truth data is obtained, the processing circuitry 800 may be configured to upload the sensor data or the truth data, for example, at regular time intervals, when a threshold speed communications connection to the FOA cloud server 855 has been established, or when the size of the buffered data reaches a threshold amount.

Having received the radar data and the truth data, the FOA cloud server 855 may be configured to perform a machine learning training operation on the FOA model 205. The machine learning training operation may involve accessing the existing FOA model 205 and modifying the FOA model using a relationship between the relative object position of the radar data and the truth data location of the truth data and using the machine learning approaches described herein, via, for example, a location-based truth link, a location and time-based truth link, or other associations between the underlying data. For example, the radar object signature may be linked to a known make and model of a vessel that the object of interest. The known make and model may be provided by or made accessible by the truth data and, for example, an identifier of the vessel that may be included in the truth data. Via these data associations, further training of the FOA model 205 may be performed using a machine learning approach. Once further training of the FOA model 205 is completed by the FOA cloud server 855, the FOA cloud server 855 may be configured to make the updated FOA model 205 available to FOA unit 730 for download and use for classification and tracking of objects of interest.

In this regard, the processing circuitry 800 may be configured to receive the FOA model 205 from the FOA cloud server 855 and store the FOA model 205 in the memory 820 of the FOA unit 730. In association with the classification and tracking of objects as described with respect to FIG. 3, the processing circuitry 800 may be configured to receive sensor, for example, in the form of radar data and apply the radar data to the FOA model 205 to perform a comparison of the radar object signature to model signatures of the FOA model 205 through implementation of the prediction engine 310. In this regard, the FOA model 205 may be constructed in such a way that forms model signatures that can be compared with received radar data of an object to find a match. One of ordinary skill in the art would appreciate that a single "snap-shot" of radar data may not be sufficient to determine a match, but that multiple sets of radar data captured at different times may be used in the aggregate for comparison with the model signature in the FOA model 205 to determine a match. In this regard, according to some example embodiments, for example, a process of elimination approach may be used to iteratively arrive at a match based on multiple, time-separated, instances of radar data. For example, elimination criteria may be used to reduce the set of possible candidate matches. Movement criteria may be considered to determine if the object of interest is a moving vessel or a stationary channel marker, and certain model signatures and associated comparisons may be eliminated from the candidate pool. For example, as a pre-filtering operation, the processing circuitry 800 may be configured to remove radar data that is beyond a shoreline and over a land mass as indicated by shoreline map data stored on or streamed to the FOA unit 730. Regardless of the manner in which the comparisons are made and any pre-filtering that may be performed, the processing circuitry 800 is configured to determine, based on the comparison, a matched model signature from the FOA model and a matched object type associated with the matched model signature.

For each model signature, other data is also associated within the FOA model 205 as described herein, as such data may be leveraged upon completion of, for example, object classification that determines an object type for an object of interest. As such, an object type may be associated with each model signature. If a given model signature is determined to be a match, and then the associated object type can be readily determined. Any number of object types may be defined for classification of an object of interest. According to some example embodiments, the object types may include categories for large watercraft (e.g., ships, barges, etc.), small watercraft (jet skis, small boats, etc.), and non-navigating objects (e.g., buoys, channel marker, underwater formations, or the like). As such, based on the matched model signature, an object type for the object of interest may be determined. Additionally, in preparation for rendering a representation of the object of interest on a display device (e.g., display 755 or mobile terminal 860), the processing circuitry 800 may be further configured to determine an icon representation for the object of interest based on the matched object type. In this regard, the processing circuitry 800 may be access a legend of intuitive icon representations that are associated with respective object types to make a determination of the icon representation of the object of interest. Additionally, based on the object type, a movement profile may be determined for the object of interest, which can be used for sensor data filtering during tracking of the object of interest.

Additionally, the processing circuitry 800 may be configured to control the display device (e.g., display 755 or mobile terminal 860) to render the icon representation of the object at a position relative to a representation of the vessel based on the relative object position. As described above, the icon representation may be placed at an intuitive location relative to, for example, the center or bow of the vessel. As such, the processing circuitry 800 has converted the received radar data into an easy-to-understand representation of the radar data that assists with general operational awareness and collision avoidance.

According to some example embodiments, the processing circuitry 800 is further configured to perform object tracking to determine an updated location, a course, and a speed of the object of interest based on the radar data. In this regard, once an area of radar data is determined to be indicative of an object, the position of the radar data signature can be tracked between time-based instances of the radar data to determine course and speed of the underlying object based only on the radar data or based on the radar date in combination with other data for tracking the object. As described herein, using the movement profile of the classified object as a filter, data that is not compliant with the movement profile may be removed from the tracking analysis to enhance performance. The processing circuitry 800 may also be configured to derive further predications based on, for example, the location, course, and speed of the object of interest. As such, the processing circuitry 800 may be configured to determine a predicted future position of the object of interest based on the course, the speed, and location.

The processing circuitry 800 may also be configured to perform a collision analysis based on the predicted future position of the object of interest. In this regard, the processing circuitry 800 may also be configured to determine the position, course, and speed of its local vessel (e.g., from onboard sensors) and analyze a predicted collision location if the vessels continue on their respective current courses. As such, the processing circuitry 800 may be configured to trigger an alert based on the predicted future position of the object of interest, which may be the predicted collision location. Such alert may be dynamically controlled based on the distance of a current location to the predicted collision location or a time of arrival of the vessel at the predicted collision location. In this regard, presentation of information regarding the other vessel on a display may change colors or flash, dynamically. According to some example embodiments, the processing circuitry 800 may be configured to trigger the alert as an audible sound via the sounder. The sounder may be any type of audio device that may be a component of a display device. For example, the audible sound may be output by the sounder 757, the mobile terminal 860, the audio device 861, or the like. According to some example embodiments, a frequency or pitch of the audible sound may be dynamically controlled based on the distance of a current location to the predicted collision location or a time of arrival of the vessel at the predicted collision location. Further, the processing circuitry 800 may be configured to determine an estimated time of contact with the object of interest based on the course, the speed, and the relative object position, and control the display device to present the estimated time of contact (e.g., as a textual presentation or a graphical presentation) in association with icon representation of the object of interest. According to some example embodiments, haptic feedback may also be provided via vibration of navigational controls (e.g., steering wheel, throttle, etc.) or controlled movement of navigational controls Additionally, the processing circuitry 800 of the FOA unit 730 may assume navigational control of the vessel in response to the distance of a current location to the predicted collision location being less than a threshold distance or a time of arrival of the vessel at the predicted collision location being less than a threshold time. In this regard, the processing circuitry 800 may communicate with, for example, the navigation system 775 to cause the vessel to evade the collision location. Such evasion actions may include slowing or turning the vessel to avoid the collision. The processing circuitry 800 may be configured to update the predicted collision location and cease control of the navigation system 775 upon determining that the predicted collision has been avoided.

In some example embodiments, the truth data may include navigation aid data (e.g., Light List information) indicating stationary positions of navigation aids (e.g., buoys, channel markers, undersea features, or the like). In such example embodiments, the processing circuitry 800 may be configured to determine, based on the radar data, that the object of interest is a non-navigating object (e.g., via radar-based position tracking that determines that the object of interest is stationary or substantially stationary). The FOA unit 730 may be configured to share this information with the FOA cloud server 855 and the FOA cloud server 855 may then be configured to perform the machine learning training operation to modify the FOA model 205 to adjust a position of the object of interest indicated within the FOA model 205 based on a difference between a stationary position of the object of interest indicated in the navigation aid data and the relative object position from the radar data.

According to some example embodiments, the FOA cloud server 855 may be configured to consider other sources of data for use with training the FOA model 205. In this regard, the FOA cloud server 855 may be configured to perform the machine learning training operation to modify the FOA model based on the image data or sonar data of the object of interest. The image data may be received from a camera 745 of the vessel and the sonar data may be received from a sonar system 720 of the vessel. The image data or sonar data may be buffered and uploaded to the FOA cloud server 855 to further train the FOA model 205. Using the trained FOA model 205, the processing circuitry 800 of the FOA unit 730 may be configured to determine the matched model signature from the FOA model based on the radar object signature and the image data or the sonar data.

Additionally, according to some example embodiments, the processing circuitry 800 may be configured to communicate, via the communications interface 840, to and from a common data and control bus trunk line (e.g., common bus 705) on the vessel to obtain the sensor data for classification and tracking, and for output FOA information resulting from the classification and tracking. In this regard, the processing circuitry 800 may be configured to receive the radar data and, in some instances, the truth data via the common data and control bus trunk line, and communicate with the display device (e.g., display 755) via the common data and control bus trunk line to control the display device to render the icon representation. According to some example embodiments, the common data and control bus trunk line may be a National Marine Electronics Association (NMEA) 2000 backbone bus.

Figure 9:
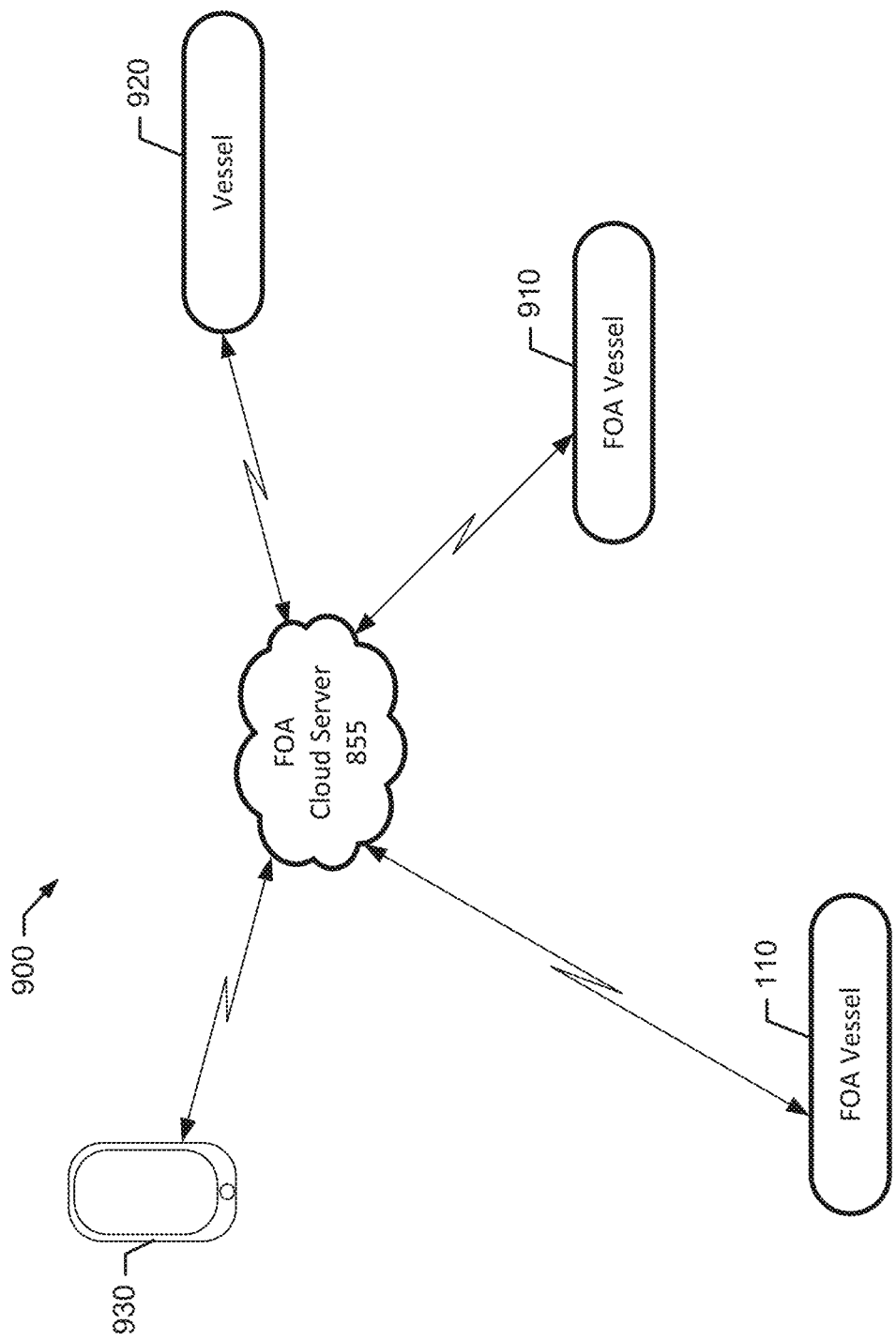
FIG. 9 illustrates a block diagram of an FOA network according to various example embodiments.

Now referring to FIG. 9, an FOA network 900 is shown. The FOA network 900 may comprise the FOA cloud server 855 and may operate to support sharing and development of aggregated FOA models with data sourced from a plurality of vessels and associated FOA units. As such, the FOA cloud 855 may be configured to receive radar data or other sensor data from FOA vessels, and store the data for use in training the FOA models. Accordingly, the processing circuitry 800 of the FOA unit 730 may be configured to transmit, to a network external to the vessel (i.e., to the FOA network 900), a communication comprising the sensor data as described above. Additionally, the FOA cloud 855 may be configured to train the FOA models, for example, based on sensor data received from any number of FOA units and associated FOA vessels. Accordingly, as shown in FIG. 9, the FOA vessels 110 and 910 may communicate with the FOA cloud 855 to upload sensor data and receive a newly trained FOA model that has been improved by the FOA cloud 855. As such, the FOA model being used by the FOA vessel 910 may have been improved via machine learning by radar data captured by another vessel, for example, FOA vessel 110.

In addition to performing FOA model training, the FOA network 900 and the FOA cloud server 855 may be leveraged to share resulting FOA prediction information via the FOA network 900 and FOA cloud server 855. In this regard, once the FOA unit 730 has classified or is tracking an object of interest, the processing circuitry 800 may be configured to share this information with the FOA cloud server 855, and the FOA cloud server 855 may be configured to, in turn, share that same information with other devices, e.g., FOA units, mobile terminals, or the like. As such, the processing circuitry 800 of the FOA unit 730 may be configured to transmit, to a network external to the vessel (i.e., to the FOA network 900), a communication comprising, for example, an identifier of the object of interest, the matched object type, and a determined geolocation of the object of interest. Additionally, according to some example embodiments, course and speed information may also be shared with and through the FOA cloud server 855. In turn, the FOA cloud 855 may receive this information and share the information with other connected entities. For example, the information regarding the object of interest may be shared with connected entities that would otherwise have been incapable of making the same determination, because such entities do not include, for example, a radar system. In this regard, the mobile terminal 930 may be located on a small boat that has no radar system. However, the classification and tracking information regarding an object of interest may be provided to the mobile terminal 930 and, using the mobile terminal's position sensors (e.g., GPS sensors, compass, etc.) a similar intuitive display of the surroundings of the mobile terminal may be presented to the user based on the object of interest information. A similar approach may be used with the vessel 920. The vessel 920 does not include a radar system but includes other marine equipment configured to receive data from external systems. As such, the marine equipment may be connected to the FOA network 900 and may therefore benefit from the FOA analysis performed by FOA units on other vessels. One of skill in the art would appreciate that the data size of the identifier of the object of interest, the matched object type, and the determined geolocation of the object of interest is also substantially less than the data size of the radar data captured and used to determine this information. As such, the transmission time and cost required to upload and download such data for sharing is substantially less than the time and cost of uploading and sharing the radar data thereby making the data more readily available for use by a variety of devices and associated data connections.

Figure 10A:
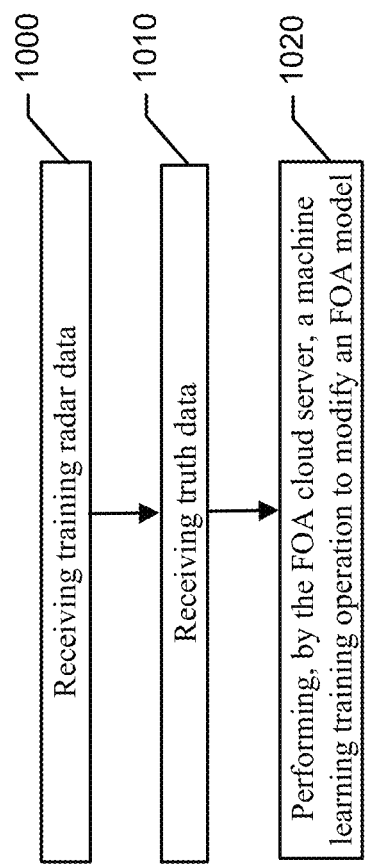
FIG. 10A illustrates a block diagram of an example method for training an FOA model according to various example embodiments.

FIG. 10A illustrates a block diagram of an example method for training an FOA model by, for example, the FOA cloud server 855. In this regard, the example method may comprise, at 1000, receiving training radar data, and, at 1010, receiving truth data. Additionally, at 1020, the example method may comprise performing, by the FOA cloud server, a machine learning training operation to modify an FOA model based on a location-based relationship between the training radar data and the truth data.

According to some example embodiments, the truth data may be automatic identification system (AIS) data, for example, received via a radio communications system, and the AIS data may comprise an AIS geolocation of the object of interest. Additionally, the example method may comprise training the FOA model based on a correlation of the MS geolocation to relative object position data in the training radar data. Additionally or alternatively, according to some example embodiments, the truth data may be navigation aid data indicating stationary positions of navigation aids. Further, according to some example embodiments, the example method may comprise using AIS data as a first component of the truth data and navigation aid data as a second component of the truth data, the AIS data indicating a geolocation of a movable vessel and the navigation aid data indicating a stationary geolocation of a navigation aid.

FIG. 10B illustrates a block diagram of an example method for providing an operator of a vessel with intuitive object detection and positioning information relative to a vessel according to various example embodiments. In accordance with the description above, according to some example embodiments, the example method may comprise, at 1030, receiving radar data. In this regard, the radar data may be provided by a radar system configured to generate the radar data based on transmitted radar signals and received radar reflection signals. The radar data may indicate, for an object of interest, a relative object position, and a radar object signature. Additionally, at 1040, the example method may comprise applying the radar data to the FOA model to perform a comparison. The comparison may be made of the radar object signature to model signatures of the FOA model. Each model signature be associated with an object type. Additionally, the example method may comprise, at 1050, determining, by processing circuitry and based on the comparison, a matched model signature from the FOA model and a matched object type associated with the matched model signature. Further, at 1060, the example method may comprise determining an icon representation for the object of interest based on the matched object type. Finally, at 1070, the example method may comprise controlling a display device to render the icon representation of the object at a position relative to a representation of the vessel based on the relative object position.

Additionally or alternatively, according to some example embodiments, the example method may further comprise determining a course and a speed of the object of interest based on the radar data, determining a predicted future position of the object of interest based on the course, the speed, and the relative object position, and triggering an alert based on the predicted future position of the object of interest. Additionally or alternatively, the example method may comprise determining a movement profile for the object of interest based on the object type, and filtering incoming radar data for tracking the object of interest based on the movement profile. Additionally or alternatively, according to some example embodiments, the example method may further comprise determining, based on the radar data, if the object of interest is a navigating object or a non-navigating object. In response to the object of interest being a navigating object, the example method may comprise using automatic identification system (AIS) data as the truth data, the AIS data indicating a geolocation of a movable vessel. In response to the object of interest being a non-navigating object, the example method may comprise using navigation aid data as the truth data, the navigation aid data indicating a stationary geolocation of a navigation aid.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A field of awareness (FOA) system that provides an operator of a vessel with intuitive object detection and positioning information, the FOA system comprising:
   an FOA cloud server configured to:
   receive training radar data;
   receive truth data; and
   perform a machine learning training operation to modify an FOA model based on a location-based relationship between the training radar data and the truth data;
   a radar system disposed on the vessel and configured to generate radar data based on transmitted radar signals and received radar reflection signals, the radar data indicating, for an object of interest, a relative object position and a radar object signature;
   a display device;
   an FOA unit disposed on the vessel, the FOA unit comprising processing circuitry, the processing circuitry being configured to:
   receive the radar data;
   apply the radar data to the FOA model to perform a comparison of the radar object signature to model signatures of the FOA model, wherein each model signature is associated with an object type;
   determine, based on the comparison, a matched model signature from the FOA model and a matched object type associated with the matched model signature;
   determine an icon representation for the object of interest based on the matched object type; and
   control the display device to render the icon representation of the object at a position relative to a representation of the vessel based on the relative object position;
   wherein the truth data is automatic identification system (AIS) data comprising an AIS geolocation;
   wherein the FOA cloud service is configured to train the FOA model based on a correlation of the AIS geolocation to relative object position data in the training radar data.

2. The FOA system of claim 1, wherein the processing circuitry is further configured to:
   determine a movement profile for the object of interest based on the object type; and
   filter incoming radar data for tracking the object of interest based on the movement profile.

3. The FOA system of claim 1, wherein the processing circuitry is further configured to:
   determine a course and a speed of the object of interest based on the radar data;
   determine a predicted future position of the object of interest based on the course, the speed, and the relative object position; and
   trigger an alert based on the predicted future position of the object of interest.

4. The FOA system of claim 3, wherein the display device comprises a sounder; and
  wherein the processing circuitry is configured to trigger the alert as an audible sound via the sounder.

5. The FOA system of claim 3, wherein the processing circuitry is further configured to:
  determine an estimated time of contact with the object of interest based on the course, the speed, and the relative object position; and
  control the display device to present the estimated time of contact in association with icon representation of the object of interest.

6. The FOA system of claim 1, wherein the truth data is navigation aid data indicating stationary positions of navigation aids.

7. The FOA system of claim 1 further comprising a camera configured to capture images of an environment of the vessel including the object of interest, wherein the images are provided to the processing circuitry as image data;
  wherein the processing circuitry is further configured to:
  determine the matched model signature from the FOA model based on the radar object signature and the image data.

8. The FOA system of claim 1 further comprising a sonar system configured to capture sonar data indicative of an environment of the vessel including the object of interest, wherein the sonar data is provided to the processing circuitry;
  wherein the processing circuitry is further configured to determine the matched model signature from the FOA model based on the radar object signature and the sonar data.

9. The FOA system of claim 1, wherein the display device is a mobile terminal; and
  wherein the display device is configured to communicate directly or indirectly with the processing circuitry via a wireless communications connection.

10. The FOA system of claim 1, wherein the matched object type is one of a large watercraft, a small watercraft, or a non-navigating object.

11. The FOA system of claim 1, wherein the processing circuitry is further configured to transmit, to a network external to the vessel, a communication comprising an identifier of the object of interest, the matched object type, and a determined geolocation of the object of interest.

12. The FOA system of claim 1, further comprising a common data and control bus trunkline;
  wherein the processing circuitry is further configured to:
  receive the radar data and the truth data via the common data and control bus trunkline; and
  communicate with the display device via the common data and control bus trunkline to control the display device to render the icon representation.

13. The FOA system of claim 12, wherein the common data and control bus trunkline is a National Marine Electronics Association (NMEA) 2000 backbone bus.

14. A field of awareness (FOA) system that provides an operator of a vessel with intuitive object detection and positioning information, the FOA system comprising:
  an FOA cloud server;
  an FOA unit disposed on the vessel, the FOA unit comprising processing circuitry;
  a display device; and
  a radar system disposed on the vessel and configured to generate radar data based on transmitted radar signals and received radar reflection signals, the radar data indicating, for an object of interest, a relative object position and a radar object signature;
  wherein the FOA cloud server is configured to:
  receive training radar data;
  receive truth data;
  use automatic identification system (AIS) data as a first component of the truth data, the AIS data indicating a geolocation of a movable vessel; and
  use navigation aid data as a second component of the truth data, the navigation aid data indicating a stationary geolocation of a navigation aid; and
  perform a machine learning training operation to modify an FOA model based on a location-based relationship between the training radar data and the truth data;
  wherein the processing circuitry of the FOA unit is configured to:
  receive the radar data;
  apply the radar data to the FOA model to perform a comparison of the radar object signature to model signatures of the FOA model, wherein each model signature is associated with an object type;
  determine, based on the comparison, a matched model signature from the FOA model and a matched object type associated with the matched model signature;
  determine an icon representation for the object of interest based on the matched object type; and
  control the display device to render the icon representation of the object at a position relative to a representation of the vessel based on the relative object position.

15. A method for providing an operator of a vessel with intuitive object detection and positioning information relative to a vessel, the method comprising:
  receiving, at a FOA cloud server, training radar data;
  receiving, at the FOA cloud server, truth data;
  performing, by the FOA cloud server, a machine learning training operation to modify an FOA model based on a location-based relationship between the training radar data and the truth data;
  receiving, at an FOA unit, radar data, the radar data being provided by a radar system configured to generate the radar data based on transmitted radar signals and received radar reflection signals, the radar data indicating, for an object of interest, a relative object position and a radar object signature;
  applying the radar data to the FOA model to perform a comparison of the radar object signature to model signatures of the FOA model, wherein each model signature is associated with an object type;
  determining, by processing circuitry of the FOA unit and based on the comparison, a matched model signature from the FOA model and a matched object type associated with the matched model signature;
  determining an icon representation for the object of interest based on the matched object type; and
  controlling a display device to render the icon representation of the object at a position relative to a representation of the vessel based on the relative object position;
  wherein the truth data is automatic identification system (AIS) data received via a radio communications system, the truth data location being an AIS geolocation of the object of interest;
  wherein the method further comprises determining the matched model signature from the FOA model based on the radar object signature, the AIS data, and a correlation of the AIS geolocation to the relative object position.

16. The method of claim 15 further comprising:
determining, at the processing circuitry of the FOA unit, a course and a speed of the object of interest based on the radar data;
determining, at the processing circuitry of the FOA unit, a predicted future position of the object of interest based on the course, the speed, and the relative object position; and
triggering an alert based on the predicted future position of the object of interest.

17. The method of claim 15, further comprising:
determining a movement profile for the object of interest based on the object type; and
filtering incoming radar data for tracking the object of interest based on the movement profile.

18. A method for providing an operator of a vessel with intuitive object detection and positioning information relative to a vessel, the method comprising:
receiving, at a FOA cloud server, training radar data;
receiving, at the FOA cloud server, truth data;
using automatic identification system (AIS) data as the truth data, the AIS data indicating a geolocation of a movable vessel; and
using navigation aid data as the truth data, the navigation aid data indicating a stationary geolocation of a navigation aid;
performing, by the FOA cloud server, a machine learning training operation to modify an FOA model based on a location-based relationship between the training radar data and the truth data;
receiving, at an FOA unit, radar data, the radar data being provided by a radar system configured to generate the radar data based on transmitted radar signals and received radar reflection signals, the radar data indicating, for an object of interest, a relative object position and a radar object signature;
applying the radar data to the FOA model to perform a comparison of the radar object signature to model signatures of the FOA model, wherein each model signature is associated with an object type;
determining, by processing circuitry of the FOA unit and based on the comparison, a matched model signature from the FOA model and a matched object type associated with the matched model signature;
determining an icon representation for the object of interest based on the matched object type; and
controlling a display device to render the icon representation of the object at a position relative to a representation of the vessel based on the relative object position.

* * * * *